United States Patent Office 3,041,481
Patented June 26, 1962

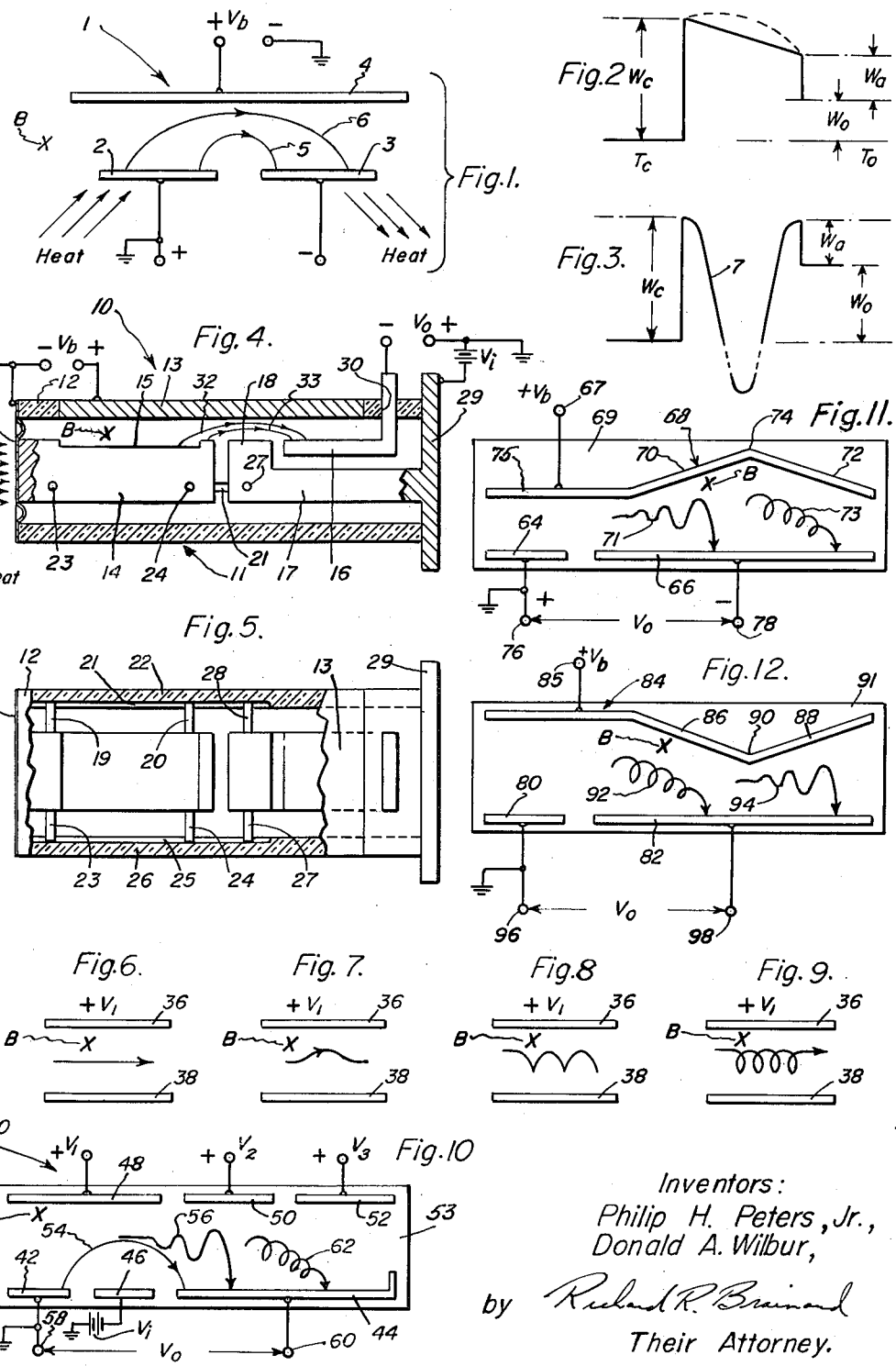

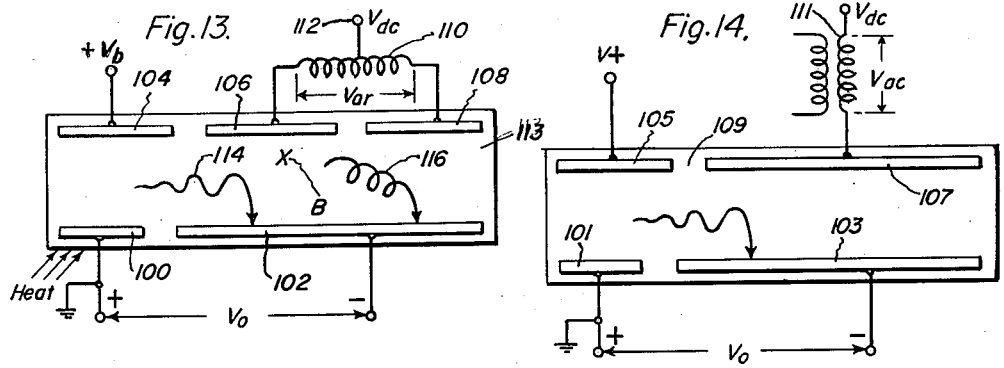
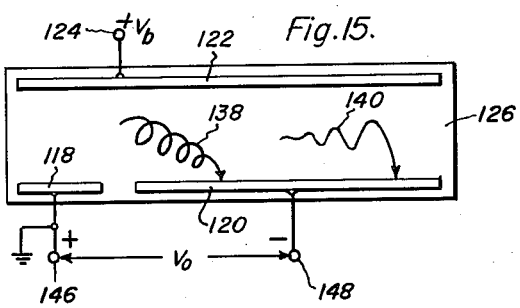
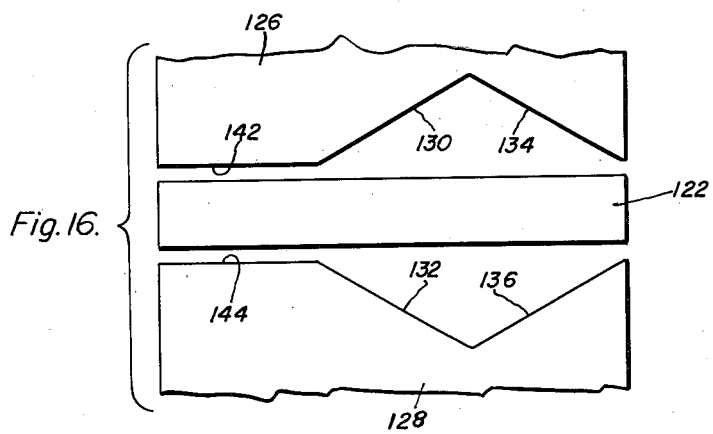
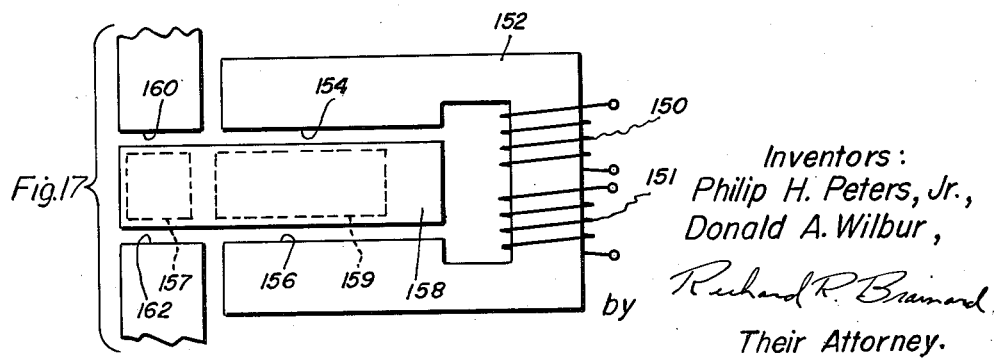
Inventors:
Philip H. Peters, Jr.,
Donald A. Wilbur,
by Richard R. Brainard
Their Attorney.

3,041,481
CROSSED FIELD THERMIONIC CONVERTER
Philip H. Peters, Jr., Greenwich, and Donald A. Wilbur, Scotia, N.Y., assignors to General Electric Company, a corporation of New York
Filed Mar. 2, 1959, Ser. No. 796,564
11 Claims. (Cl. 310—4)

This invention relates to a thermionic converter for converting heat energy to electricity and more particularly relates to a novel electrode arrangement cooperable with crossed electric and magnetic fields to provide improved thermionic converter operation.

For converting heat energy to electrical energy, it is known to dispose a cathode of relatively high work function material in face-to-face relationship with a collector electrode of relatively low work function material. The interelectrode space is maintained evacuated and the cathode is maintained hot relative to the collector whereby electrons are emitted from the cathode and collected at the collector. By reason of the contact potential resulting from the work function difference between cathode and collector materials, a potential capable of performing useful work in an external circuit is developed.

In such an apparatus, serious limitations are imposed on the output capacity and efficiency of the converter by the effect of space charge in the interelectrode region and high heat transfer from cathode to collector. The space charge manifests itself as an aggregation of electrons in the interelectrode space which possesses a high negative charge repelling electrons newly emitted from the cathode. Thus, the total current output and efficiency of the converter are decreased. The adverse effects of space charge may be lessened by decreasing the spacing between electrodes but such decreased spacing has the adverse effect of increasing the heat transfer from cathode to collector electrode. Such increased heat transfer decreases the useful heat energy producing electron emission at the cathode and increases the electron emission at the collector to reduce the net number of electrons passing from cathode to collector with the result that output capacity and efficiency are again decreased. Also, space charge effects may be minimized by a supply of positive ions in the interelectrode space.

It is accordingly a primary object of our invention to facilitate the conversion of heat to electricity by the collection of electrons thermally emitted from a cathode without the usual adverse effects of either space charge or high heat transfer between electrodes.

It is another object of our invention to increase the output capacity and efficiency of a thermionic converter.

It is another object of our invention to facilitate collection of electrons in a thermionic converter at relatively low energies and to utilize a high percentage of emitted electrons.

Pursuant to the foregoing objects and in accordance with a feature of one embodiment of our invention, the cathode and collector electrodes of a thermionic converter are each in the form of a sheet and are disposed in side-by-side spaced relationship. The cathode is preferably of material having a high work function relative to the material of the collector. An acceleration is imparted to electrons thermally emitted from the cathode by a positively charged anode electrode spaced from both the cathode and collector and such electrons are curved and directed to the collector by the Lorentz effect of a magnetic field perpendicular to the electric field formed between the cathode and accelerating anode. Thus, the effects of space charge are countered by the effects of the accelerating anode and reduced to a very low value. By reason of the relatively large spacing between cathode and collector electrodes and by reason of their side-by-side relationship, the transfer of heat therebetween is also minimized. Each of the adverse effects hereinabove described are greatly decreased without compromise as to the other.

In accordance with another feature of this invention, an isolating electrode is disposed in the space between a side-by-side arrangement of a cathode electrode and a collector electrode of a crossed field thermionic converter and the same is biased negatively with respect to the cathode electrode. Thus, electrons emitted from the cathode at such initial positions and at such velocities, which, under the influence of the crossed fields, would travel in the space between the cathode and collector and be collected at the cathode in the absence of an isolating electrode, are subjected to the increased electric field gradient between accelerating anode and the isolating electrode, to be deflected into the interelectrode region away from the isolating electrode. Such deflected electrons have their paths elongated and are caused to impinge upon the collector electrode with a consequent increase in output capacity and efficiency. Collection of the electrons at minimum kinetic energy is effected by space or time variation of the ratio of the electric field to the magnetic field in the converter to cause the electrons to assume trajectories wherein they come close to or in contact with the collector electrode at a minimum velocity and consequent minimum kinetic energy for collection thereat.

Other and further objects and advantages of our invention will appear from a consideration of the following detailed description taken with the accompanying drawings in which:

FIG. 1 is a schematic representation of the electrode structure of a crossed field thermionic converter according to the invention, FIGS. 2 and 3 are energy level diagrams for a thermionic converter showing the improvement achieved in crossed field operation, FIGS. 4 and 5 are cross-sectional elevation and partially cut away plan views, respectively, showing a physical embodiment of one form of our invention including the elements of an improved thermionic converter, FIGS. 6, 7, 8 and 9 show representative electron trajectories of different velocities in crossed fields, FIG. 10 is a schematic representation showing the electrode and magnetic pole arrangement of an improved thermionic converter according to another embodiment of our invention having plural accelerating anodes, FIG. 11 is a schematic representation showing the electrode and magnetic pole arrangement of another embodiment of our invention including an accelerating anode having portions forming a dihedral angle and being concave facing the collector electrode, FIG. 12 is a schematic representation showing the electrode and magnetic pole arrangement of another embodiment of our invention including an accelerating anode having portions forming a dihedral angle and being convex facing the collector electrode, FIG. 13 is a schematic representation showing the electrode and magnetic pole arrangement of another embodiment of our invention having an alternating potential applied to adjacent accelerating anode sections for producing an alternating electric field between these sections and the collector electrode, FIG. 14 is a schematic representation showing the electrode and magnetic pole arrangement of another embodiment of our invention having an alternating potential applied to a single one of two accelerating anode sections to produce an alternating electric field between anode sections, FIGS. 15 and 16 are schematic representations showing respective side and top views of the electrode and magnetic pole arrangement of another embodiment of our invention having magnetic pole faces shaped so as to provide a varying intensity of magnetic field in and transverse to the space between the accelerating anode and collector electrode, and FIG. 17 is a schematic representation showing the anode and magnetic pole structure of another embodiment of our invention having means for providing an alternating magnetic field of varying intensity in and transverse to the space between the accelerating anode and collector electrode.

Referring now to FIG. 1 of the drawings illustrating schematically a basic cell of a crossed field thermionic converter according to our invention, 1 represents the thermionic converter in its entirety including an electron emissive cathode electrode 2 responsive to heat applied as indicated by the arrows to emit electrons, an electron collecting electrode 3 disposed in edgewise alignment with the cathode electrode and an accelerating or beam forming anode electrode 4 preferably equidistantly spaced from cathode and collector electrodes. For simplifying the explanation, the electrodes are shown as being planar members, is being understood, however, that the same may be of arcuate or circular cross section. For influencing the movement of the electrons, a magnetic field in a direction corresponding to a direction perpendicular to and into the plane of the paper in FIG. 1, of constant value, is established as represented by the cross at B and an electric field between the beam forming electrode 4 and cathode electrode 2 is established by a potential externally applied between these electrodes as indicated $V_b$ on the drawing. By a proper selection of materials for electrodes 2 and 3, as described more fully hereinbelow, a proper application of respective electric and magnetic field intensities and application of sufficient heat to cathode electrode 2, an output potential positive at cathode 2 and negative at collector 3 is produced across these electrodes due to the electron current flow.

For satisfactory operation as a converter, according to a feature of our invention, the materials of cathode and collector electrodes are of relatively high and low work functions, respectively. That is, the energy of transition of an electron from a position within the cathode to a position removed from the cathode must necessarily be greater than the energy of transition of an electron from a position removed from the collector electrode to a position within the collector electrode. The difference between such energies, minus various losses, is equal to the useful work attainable from an electron at the output of the thermionic converter. This is graphically illustrated in FIGS. 2 and 3 of the drawings showing the operating characteristics of converters having interelectrode space charge and absence of such space charge, respectively, and wherein $W_c$ represents the work function of the material of the cathode, indicating the energy or work required to remove an electron from the cathode. $W_a$ represents the work function of the material of the collector electrode indicating the energy or work involved in an electron entering the collector electrode from a point removed therefrom and $W_o$ represents work attainable at the output of the converter.

A point of reference is taken at the Fermi energy level within the cathode which is the energy of a free electron within the metal and the work function is measured with respect to this level. In tracing an electron in its travel about the circuit, and beginning at the cathode, the heat energy applied to the cathode imparts to a free electron, energy greater than the work function $W_c$ shown in FIG. 2, whereby such electron overcomes the influences tending to retain the same within the cathode and it drifts into the region between cathode and beam forming electrode 4 along a path designated at 5 in FIG. 1. The acceleration of the beam forming electrode 4 largely overcomes the effects of space charge which would present a potential barrier as indicated by the dotted line in FIG. 2 and the electron loses potential energy with respect to the Fermi level in its travel to the collector under the influence of the magnetic field. The electron is then taken in by the collector electrode and loses potential energy $W_a$ in the process. In its travel through the load circuit and back to the cathode, the electron dissipates energy $W_o$ in an external load circuit.

In a converter wherein, according to our invention, parameters are such as to reduce the space charge to a minimum value, it possesses a characteristic as shown in FIG. 3, and considerably greater output potential and work may be derived from the converter. Thus, an electron may assume a path as indicated at 6 in FIG. 1, and as shown in FIG. 3, the potential energy of such electron varies as shown by the line 7 between electrodes. The electron begins its flight at the cathode with a potential energy of $W_c$ with respect to the Fermi energy level of the cathode and with a kinetic energy equal to the thermal energy of the electron and decreases in potential energy as it approaches the accelerating anode 4. At its nearest approach to the anode 4, it possesses a minimum of potential energy as represented at the bottom of curve 7 in FIG. 3. As herein explained, the electron then curves away from the anode 4 under the Lorentz effect of the magnetic field and increases in potential energy until it reaches the collector electrode where it is collected with a kinetic energy substantially equal to the thermal energy imparted at emission. Under these circumstances, the terminal velocity of the electron need not be determined by the effects of space charge in its flight and it possesses a higher potential energy at its destination at the collector than an electron required to overcome the effects of such space charge. It is observed that in a space charge free converter, the potential energy of a collected electron is substantially the same as an electron emitted from the cathode. Therefore, the output energy represented by $W_o$ is equal to the potential energy of an electron just prior to collection, less the work function of the collector. The advantages of the elimination or minimization of the effects of space charge are seen to be in greater output potential and efficiency of the converter.

Referring now to FIGS. 4 and 5 of the drawings for a detailed description of one embodiment of our invention, 10 represents generally an improved thermionic converter in its entirety including a hollow housing or cradle 11 of generally rectangular cross section and being made of a suitable heat resistant insulating ceramic material. A portion of the upper wall 12 of the cradle is removed and replaced with a metallic accelerating anode 13 which is sealingly bonded to the cradle at adjoining surfaces.

Within the cradle 11 are mounted a metallic cathode 14 with a thremionic emission enhancing coating on a surface 15, a spaced collecting electrode 16 and according to another feature of our invention, an isolating electrode 17 having a portion 18 disposed between the cathode and collector. For supporting cathode 14, a pair of pins 19 and 20 shown in FIG. 5 are rigidly secured to one side of the cathode and are accommodated in a groove 21 along the inner side wall 22 of the cradle and a second pair of pins 23 and 24 are rigidly secured to the other side of the cathode and are accommodated in a groove 25 in the other side wall 26 of the cradle. The isolating electrode 17 may be supported at one end in a manner similar to the support for cathode 14 by a pair of pins 27 and 28 rigidly secured to the electrode on opposite sides thereof and being slidable along respective grooves 21 and 25. The end of the isolating electrode remote from pins 27 and 28 is secured to a conductive end wall 29. For supporting collector electrode 16 in spaced relation from portion 18 of isolating electrode 17, a portion of the collector extends through a slot 30 in wall 12 and is bonded thereto at adjoining surfaces. The interior of the cradle is closed at the end remote from wall 29 by a metal foil 31 bonded to the edges of the cradle end and also conductively secured to cathode 14. The foil is adapted to be heated in any suitable manner to transfer heat to the cathode 14 to raise the same to a temperature of thermionic emission.

The group of electrodes in this arrangement together with accelerating anode 13 comprises only one section of our converter wherein a series of such groups having like electrodes similarly arranged may be repeated to provide an increased output capacity to the converter. A second or more groups may be included wherein the cathode, isolating electrodes and collectors may be disposed relative to each other as cathode 14, isolating electrode 17 and collector 16 are disposed relative to each other and furthermore, all like electrodes may be connected in parallel circuit arrangement. For facilitating relatively free electron movement, the interior of the cradle is evacuated or filled with gas at low pressure.

For imparting an acceleration to electrons emitted from the cathodes of the converter, accelerating anode 13 is biased positively with respect to the cathode 14, as represented by a battery $V_b$, to establish an electirc field for electron acceleration between the electrodes.

To achieve proper electron movement, the entire interelectrode space in converter 10 is immersed in a magnetic field represented by the cross at B indicating a flux perpendicular and into the paper of the drawing in FIG. 4 and provided by any suitable permanent or electromagnets.

Copius electron emission from the cathode is produced by applying heat from any suitable source to the cathode as represented by the arrows in this figure of the drawings. The electrons emitted from along the upper surface of the cathode, into interelectrode space, are attracted to anode 13 and are simultaneously subjected to the influence of the Lorentz effect of the magnetic field B whereby the same follow cardioidal paths as shown at 32, for example. Such electrons are emitted at relatively low velocity and in the course of their travel along path 32, successively receive energy from and impart energy to anode 13 and finally arrive at the collector 15 at substantially the velocity of their emission, and are collected at the collector. Various other electrons, however, are emitted at various velocities from other portions of the cathode, including the edges thereof, and in the absence of an isolating electrode they would tend to follow paths not terminating at the collector.

According to a feature of our invention, isolating electrode 17 is biased negatively with respect to the circuit cathodes as indicated by the direct potential source $V_i$ to repel and deflect any electrons tending to follow shortened paths leading to the space between the cathode and collector. Similarly, electrons emitted from sections of the cathode remote from the adjacent isolating electrode have their paths extended by the deflecting isolating electrode sufficiently to be collected at the adjacent collector as shown by path 33. Accordingly, an output potential $V_o$ is produced across terminals connected to the cathode and collector, respectively.

In accordance with another feature of our invention, the trajectories of electrons emitted from the cathode are controlled so as to effect collection at very low kinetic energy levels. To facilitate an understanding of this feature of our invention, reference is first made to FIGS. 6, 7, 8 and 9 of the drawing illustrating the trajectories of electrons at different initial velocities under the influence of crossed fields of the same, respective magnitudes. In each of the figures, an electric field of uniform magnitude between a pair of electrodes 36 and 38, is established by a direct potential $V_1$ applied between the electrodes and being positive at electrode 36. A magnetic field perpendicular to and into the plane of the paper is designated by the cross at B in each FIG. 6, 7, 8 and 9.

In FIG. 6, an electron of predetermined velocity is projected into the interelectrode space substantially perpendicular to each field and is subjected to the influence of the crossed fields. In these circumstances the trajectory is a straight line indicating that the electron speed is such that the force of the electrostatic attraction of the electron toward electrode 36 is equal and opposite to the force produced by the Lorentz effect acting on the electron at right angles thereto and tending to move the electron toward electrode 38. Thus, the electron travels along a straight line as long as these conditions prevail.

In FIG. 7, an electron projected into the interelectrode region at a velocity less than the predetermined velocity has both electrostatic and Lorentz effect forces thereon but since the electron is travelling at a lower speed, the effect of the magnetic field B is initially of lesser intensity than that produced at the predetermined velocity. Thus, the force produced by the Lorentz effect is less than the electrostatic attraction, which remains substantially constant, whereby the electron curves and has a component of travel toward the positive electrode 36. During such travel, however, the electron increases in speed whereby the Lorentz effect forces are increased and in fact become greater than the electrostatic attraction and the electron in due course curves away from electrode 36 and travels with a component of velocity toward electrode 38. This reduces the electron speed by reason of the retarding effect of electrostatic forces thereby reducing the influence of the Lorentz effect, whereby in due course, the electron curves away from electrode 36 and again travels with a component of velocity toward electrode 38. Under the circumstances described, the electron follows a periodic, undulatory trajectory in the interelectrode region of the type described and shown.

In FIG. 8, the electron with an initial velocity greater than the predetermined velocity of the electron in FIG. 6 is projected in the interelectrode region whereby the forces of the Lorentz effect are great and curve the electron more rapidly than as shown in FIG. 7. The electron is curved due to the Lorentz effect and directed toward electrode 38. Under the proper balance of fields, as indicated in this figure, the electron while being retarded in its travel toward electrode 38 comes to a complete standstill at its closest approach to electrode 38 and is thereafter rapidly accelerated toward electrode 36 whereafter a similar sequence of events occurs to cause the electron to follow the cycloidal path described and at or near the point of no motion, the electron possesses low kinetic energy. In a thermionic converter, electrons having such motion could be collected at the cusps with little or no loss in energy.

In FIG. 9, the electron is projected into the interelectrode region even more rapidly than the electron in FIG. 8. By reason of the high speed of the electron the forces due to the Lorentz effect are even greater than those described in FIG. 8 and the electron is sharply curved away from the electrode 36 and toward electrode 38. The electron under these circumstances during its travel away from positive electrode 38 has considerable speed whereby the same does not come to a standstill but rather continues in its curved path under the forces of the Lorentz effect whereby it curves to have a component of velocity reverse to that of its initial direction of travel. The electron continues to curve and after its nearest approach to electrode 38, is accelerated toward electrode 36 by the electrostatic forces and again is rapidly accelerated to be influenced in the manner described. The electron in its travel forms a series of closed loops but at its nearest approach to electrode 38 is possessed of rather low kinetic energy due to its low velocity.

It is possible to alter the trajectories of electrons shown in FIGS. 6, 7, and 9 to have substantially the trajectory shown in FIG. 8 by applying influences tending to alter the speed of the electron. For example, by altering the relative magnitudes of the crossed fields traversed by an electron as shown in FIG. 7, the electron may be caused to follow a path as shown in FIG. 8. By progressively increasing the ratio of the intensity of the magnetic field in relation to the electric field, along the electron path, the corresponding Lorentz effect for the same speed electron is increased and the trajectory gradually becomes as shown in FIG. 8. Alternatively, by progressively decreasing this ratio along the path of electrons as shown in FIG. 9, the electron trajectory also gradually becomes as shown in FIG. 8. According to another feature of our invention this phenomena is exploited to further achieve greater efficiencies and capacities of thermionic converters.

Referring now to FIG. 10 of the drawing for a detailed description of another embodiment of our invention, 40 represents generally the entire thermionic converter apparatus according to this embodiment, including a cathode electrode 42, a collector electrode 44, an isolating electrode 46 and a plurality of 3 accelerating electrodes 48, 50 and 52. The isolating electrode 46 is made negative with respect to cathode electrode 42 as indicated by potential $V_i$ and positive direct potentials $V_1$, $V_2$ and $V_3$, are applied to respective accelerating electrodes 48, 50 and 52 as indicated by legend on the drawing. According to a feature of our invention, the values of $V_1$ and $V_3$ are each greater than the value of $V_2$, and the value $V_3$ may be equal to or different from the value of $V_1$. A direct magnetic field, perpendicular to and into the paper as indicated by the cross at B is applied to the interelectrode region by poles, one of which is shown at 53.

Electrons are emitted from cathode 42 at the thermal velocity of emission. Certain of the electrons ideally assume trajectories as indicated by the curved line 54 shown in this figure which is a trajectory of the type shown in FIG. 8. The electron begins its trajectory with zero or very low velocity, is accelerated by the electric field and curved by the magnetic field along the path 54 to arrive at collector electrode 44 with substantially the velocity of emission. Due to influences other than the crossed fields, however, many electrons emitted from the cathode are adversely affected whereby the same are deflected from the ideal paths 54. These electrons may assume trajectories leading into the interelectrode region between electrodes 44 and 50 or 44 and 52. An example of such an adverse influence is the space charge which may exist in a region from the cathode 42 despite the effect of accelerating electrode 48 or the influence of one or more electrons on another.

In accordance with the relative values of potentials $V_1$ and $V_2$, a progressively decreasing potential gradient appears in the interelectrode region near planes perpendicular to the ends of electrodes 48 and 50. Stated differently, the gradient from a point between electrodes 46 and 48 but to the left of the right edges of these electrodes as seen in FIG. 10, to a point between electrodes 44 and 50 and to the right of the left edges of these electrodes as seen in FIG. 10, gradually decreases by reason of the difference of potential between $V_2$ and $V_1$. Thus, an electron deflected from the ideal path as shown at 54, may assume a path as designated 56. Such an electron initially travelling along a path as indicated at 56 with a component of velocity predominantly parallel to the electrode surfaces encounters the progressively decreasing electric field hereinabove described and under the combined influences of the steady magnetic field and gradually decreasing electric field, begins an undulatory motion which gradually increases in amplitude with each reversal of the direction of the electron. At and near the upper and lower extremities of the path of the electron as shown in this figure, the velocity in the direction parallel to the electric field is very low. Thus, as the undulations of the electron gradually increase, it comes nearer and nearer to the collector electrode 44 until it finally contacts the collector and is collected thereat.

The gradually increased undulation of the electron in traversing the gradually decreasing electric field may be qualitatively explained as being the result of progressively decreasing retarding and accelerating forces on the electron due to the decreased electric field encountered along its path. Thus, the electron must be accelerated over a greater distance before its velocity is sufficient for the Lorentz effect to alter its direction of travel and it must travel over a greater distance during retardation before its course may be changed.

By a judicious selection of field intensities in relation to each other and in relation to the spacing between electrodes, the collection of the vast majority of electrons having trajectories as shown at 56 may be collected at the collector 44, and an output potential $V_o$ is derived across terminals 58 and 60 connected to cathode 42 and collector 44, respectively and is positive at 58 and negative at 60. Under such conditions, the electron is initially nearer to the collector 44 than to anode 50 and the small, gradual increments in its undulations therefore facilitates collection at the collector and at low velocity rather than at anode 48 or anode 50.

Further in accordance with another feature of our invention, in the event that an electron of relatively higher velocity passes through the region between anode 50 and collector 44 without being collected at collector 44, it encounters a gradually increasing electric field in passing from the region between anode 50 and collector 44 and near the adjacent edges of anodes 50 and 52 and between anode 52 and collector 44 near these edges. Such an electron, by reason of its great velocity may, before reaching this region of increasing field, be caused to follow a looped trajectory as shown at 62 in FIG. 10 or in FIG. 9. In the region of the gradually increasing field, however, progressively greater electric accelerating forces are imposed on the electron to cause the loops to decrease in size and the general course of the trajectory is toward the collector 44. Thus, the electron moves gradually nearer and nearer to the collector with each successive loop until the approach is so close that the electron is collected at the collector.

The gradually diminishing loops may be considered the result of the effect of the gradually increasing electric field with respect to the steady magnetic field. In its progression, in successive loops, the electron requires less distance for acceleration to a speed wherein the Lorentz effect predominates and changes its direction of travel. The general curvature of the trajectory may be accounted for by the curvature of the electric field in the interelectrode region and the tendency of the electron to progress generally at right angles to both fields.

According to the foregoing it is observed that the effect of the plural anode arrangement described, is to collect virtually all electrons emitted from cathode 42 at low values of kinetic energy. Electrons assuming ideal paths as at 54 or deflected paths as at 56 or 62 are all influenced to arrive at the collector at low speeds. Accordingly, the efficiency of the converter is increased by reason of the increased number of electrons usefully collected and the collection of the electrons at low speed.

In accordance with another embodiment of our invention as illustrated in FIG. 11 of the drawing, a thermionic converter having a cathode 64, and collector 66 is provided and according to a feature of this embodiment of my invention, a multipartite accelerating anode 68 having sections 70 and 72 convergent with respect to each other toward an apex 74 for establishing varying electric fields, is provided. Sections 70 and 72 are also convergent with collector 66 along their lengths and section 70 is joined with a third section 75 of the anode which is generally parallel with the cathode and collector. In this embodiment of our invention, a positive potential, designated $V_b$ is applied to anode 68 through a terminal 67 connected to the anode and the gradually decreasing and gradually increasing potential gradients in the interelectrode region through which emitted electrons travel, are established between respective anode sections 70 and 72 and collector 66 by reason of the gradual variations in spacing. A steady magnetic field designated by the cross at B is established perpendicular and into the paper as seen in this figure by field poles, one of which is shown at 69. Thus, electrons emitted from cathode 64 and being deflected from ideal paths as hereinabove described, and as shown at 71 and 73 are caused to be collected at the collector 66 for the reasons as explained hereinabove with respect to electrons encountering gradually increasing or decreasing fields in FIG. 10. An output between cathode 64 and collector 66 may be taken across terminals 76 and 78 connected to these respective electrodes.

According to another embodiment of our invention as shown in FIG. 12 of the drawings, a thermionic converter including a cathode 80 and collector 82 is provided as in the converter of FIG. 11 and a tripartite accelerating anode 84 is provided in spaced relation to the cathode and collector. The sections of anode 84 are disposed as the mirror image of anode 68 wherein sections 86 and 88 of the anode are convergent with respect to each other and with respect to collector 82 at an apex 90. A positive potential $V_b$ is applied to anode 84 through a terminal 85 connected thereto and a magnetic field of constant intensity designated by a cross at B perpendicular to and into the plane of the paper is established in the interelectrode region by poles, one of which is shown at 91. Between respective sections 86 and 88 and collector 82 are regions of increasing and decreasing electric field intensity, respectively, where electrons from cathode 80 deflected from ideal paths as hereinabove described, are caused to follow paths as indicated at 92 and 94 in the increasing and decreasing field regions, respectively. As before, these trajectories are explainable as being due to the changing ratio of magnetic to electric field. The output of the converter may be taken across cathode 80 and collector 82 through terminals 96 and 98 connected to these respective electrodes.

In the embodiments of invention shown in FIGS. 11 and 12, of the drawings, it is to be understood that the electric field gradient between accelerating anode and collector may also be established by a varying spacing therebetween along their lengths, resulting from a collector electrode structure with divergent portions and an accelerating anode structure that is continuous. Thus, for example, the collector 66 in FIG. 11 may have a portion intermediate to its ends, divergent away from the interelectrode region and the collector in such case would be substantially straight.

Referring now to FIG. 13 of the drawings illustrating another embodiment of our invention, a thermionic converter having a cathode 100 and a collector 102 shown in coplanar disposition for purposes of simplicity in explanation and a group of three, preferably coplanar accelerating anodes, 104, 106 and 108 is provided. The electrodes 102, 104 and 106 may be of arcuate or circular cross section. According to a feature of this embodiment of our invention, a direct potential designated $V_b$ is applied to anode 104 and a direct potential $V_{dc}$ having an alternating potential $V_{ac}$ of any suitable frequency superimposed thereon, is applied to anodes 106 and 108. A winding 110 being a transformer secondary having respective ends connected to anodes 106 and 108, and a center tap connected to terminal 112, establish circuitry for application of such potentials. A steady magnetic field as designated by the cross at B is established perpendicular and into the plane of the paper by poles, one of which is shown at 113.

Potential values and spacings are established whereby the majority of electrons travel from cathode 100 to anode 102 along ideal paths as hereinabove described. According to a feature of this embodiment of our invention, however, the electric field intensity between accelerating anodes and the collector changes not only with the distance from the cathode but also as a function of time by reason of the applied alternating potential. Thus, deflected electrons may assume paths as shown at 114 and 116 and the collecting influence thereon may persist for regions further removed from interanode spaces. The alternating field providing alternately positive and negative potentials to the respective anodes 106 and 108 alternately effects collection of relatively slow and fast electrons at the collector.

A modification of the embodiment of invention of FIG. 13 is shown in FIG. 14 wherein a cathode 101, a collector 103, accelerating anodes 105 and 107 and magnetic pole piece 109 are disposed in similar arrangement to the components in FIG. 13. In FIG. 14, however, accelerating anode 107 is the only additional accelerating anode. An alternating potential, $V_{ac}$, is superimposed on a direct potential $V_{dc}$ applied to anode 107, through a transformer secondary 111 through which the direct potential is applied. In other respects, the structure of FIG. 14 is similar in structure and operation to the structure of FIG. 13.

Referring now to FIGS. 15 and 16 of the drawing illustrating another embodiment of our invention, a thermionic converter including a cathode 118, a collector 120 disposed in generally coplanar arrangement with the cathode and an accelerating anode 122 disposed in parallel spaced relationship to the cathode and collector is provided. A direct potential $V_b$ is applied between cathode 118 and anode 122 through a terminal 124 and is positive at anode 122. According to a feature of this embodiment of our invention as shown more clearly in FIG. 16, a magnetic field of gradually varying intensity is set forth in the interelectrode region and perpendicular to the electric field by a pair of opposed magnetic poles 126 and 128 of relatively high permeability material such as iron and disposed on opposite sides of anode 122. To achieve a varying magnetic field, each of the poles 126 and 128 is provided with a pair of pole faces which have respective first portions 130 and 132 thereof divergent with respect to each other in one direction of travel and respective second portions 134 and 136 thereof convergent with respect to each other in the same direction of travel. Thus, in between the cut away portions 130 and 132 of the poles, the magnetic field intensity gradually decreases by reason of the decreased permeability of the flux path. Accordingly, in the region between portions 130 and 132, fast moving electrons deflected from ideal paths from cathode 118, may be collected at collector 120 as indicated by the looped electron path 138. The effect on an electron of the gradually decreasing magnetic field intensity in a region of a crossed, constant electric field is observed to be the same as the effect of a gradually increasing electric field intensity in a region of constant magnetic field intensity. That is, the ratio of electric field intensity to magnetic field intensity gradually increases in each case.

In the region between portions 134 and 136, however, the ratio of electric field intensity to crossed magnetic field intensity gradually decreases by reason of the gradually increasing magnetic field intensity and therefore the slower electrons deflected from ideal paths will be collected by assuming paths similar to that indicated at 140. Non-deflected electrons travel between cathode and collector between pole face portions 142 and 144 which establish a substantially uniform magnetic field by reason of their substantial parallelism. An output potential $V_o$ may be taken across cathode 118 and collector 120 by respective terminals 146 and 148 connected thereto.

According to still another embodiment of our invention, as shown in FIG. 17 of the drawings, a time varying magnetic field is established in an interelectrode region of a thermionic converter by alternating and direct potentials applied to respective windings 150 and 151 wound on a core 152 which terminates in a pair of generally parallel planar pole faces 154 and 156 and having an accelerating anode 158, and a converter cathode and collector shown dotted at 157 and 159, respectively, therebetween. Electrons travelling undeflected paths from the cathode are influenced by magnetic poles 160 and 162 giving substantially parallel opposing faces to produce a uniform field and deflected electrons are collected in the interelectrode region between faces 154 and 156. The varying magnetic field between faces 154 and 156 is effective to alter the ratio of electric field intensity to magnetic field intensity to alternately achieve collection of slow and fast deflected electrons.

In each of the aforedescribed embodiments of invention, the electrodes of the thermionic converter are contained in either an evacuated chamber or a chamber filled with a suitable gas such as cesium vapor at low pressure. Any suitable source of heat may be utilized for raising the temperature of the cathodes to a value of high electron emissivity. Such sources may include means for utilizing heat from a flame, solar radiation, nuclear reactions and other sources. It is to be understood that the embodiments of invention shown in FIGS. 11 through 17 and not having isolating electrodes may advantageously include such isolating electrodes, the same having been omitted for purposes of brevity and clarity.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. An apparatus comprising an electron emissive cathode electrode and a spaced electron collector electrode in edgewise alignment with said cathode electrode, an isolating electrode spaced from said cathode and collector electrodes and interposed therebetween, an accelerating anode electrode spaced from said cathode collector and isolating electrodes, means for applying a direct potential to said isolating electrode negative with respect to said cathode and means for producing crossed electric and magnetic fields between said accelerating electrode and each of said cathode and collector electrodes for deflecting electrons emitted from said cathode to said collector electrode.

2. An apparatus comprising an electron emissive cathode electrode, an electron collector electrode spaced from said cathode electrode and in edgewise alignment therewith, an isolating electrode interposed between said cathode and collector electrodes, an accelerating electrode equidistantly spaced from each of said cathode, collector and isolating electrodes, means applying a direct potential to said isolating electrode negative with respect to said cathode and means for producing crossed electric and magnetic fields between said accelerating electrode and each of said cathode and collector electrodes for deflecting electrons emitted from said cathode to said collector electrode.

3. An apparatus comprising an electron emissive cathode electrode and a spaced electron collector electrode in edgewise alignment with each other, the work function of said cathode being greater than the work function of said collector, an isolating electrode interposed between said cathode and collector electrodes, an accelerating electrode having each of said cathode, collector and isolating electrodes spaced from one side thereof, means applying a direct potential to said isolating electrode negative with respect to said cathode and means for producing crossed electric and magnetic fields between said accelerating electrode and each of said cathode and collector electrodes for deflecting electrons emitted from said cathode to said collector electrode.

4. An apparatus comprising an electron emissive cathode and a spaced electron collector electrode in edgewise alignment with each other, an isolating electrode interposed between said cathode and collector electrodes and means for rendering said isolating electrode negative with respect to said cathode electrode, an accelerating electrode having said cathode, collector and isolating electrodes disposed on the same side thereof and means for rendering said accelerating electrode positive with respect to said cathode electrode and means for establishing a magnetic field transverse to the path between said cathode electrode and said collector electrode.

5. An apparatus comprising a cathode electrode having an electron emissive surface and means for heating said cathode electrode to a temperature of electron emissivity, a collector electrode for collecting electrons emitted from said cathode and having a collecting surface in edgewise alignment with said emissive surface, an isolating electrode located between said collector and cathode electrodes having a surface in edgewise alignment with said emissive surface, an accelerating electrode having said cathode, anode and isolating electrodes disposed on one side thereof, means rendering said accelerating electrode positive with respect to said cathode electrode and said isolating electrode negative with respect to said cathode electrode and means establishing a magnetic field transverse to the path from said cathode electrode to said accelerating electrode.

6. An apparatus comprising an electron emissive cathode electrode and a spaced electron collector electrode in edgewise alignment with each other, means for heating said cathode to a temperature of electron emissivity, an isolating electrode interposed between said cathode and collector electrodes and being biased negatively with respect to said cathode, an accelerating electrode spaced from each of the aforementioned electrodes and being biased positively with respect to said cathode electrode and means establishing a direct magnetic field between said electrodes perpendicular to the path between said accelerating electrodes and each of said cathode and collector electrodes.

7. An apparatus comprising an electron emissive cathode electrode and a spaced electron collector electrode having respective surfaces in edgewise alignment with each other, the work function at said surface of said cathode being higher than the work function at the surface of said collector, means for heating said cathode to a temperature of electron emissivity, an isolating electrode having a surface between said cathode and collector electrodes and in edgewise alignment therewith, an accelerating electrode spaced from said cathode, collector and isolating electrodes, means applying a direct potential to said isolating electrode negative with respect to said cathode and means of producing crossed electric and magnetic fields between said accelerating electrode and each of said cathode and collector electrodes for deflecting electrodes emitted from said cathode to said collector electrode.

8. An apparatus comprising an electron emissive cathode electrode and an electron collector electrode having respective surfaces in edgewise alignment with each other, an isolating electrode interposed between said cathode and collector electrodes and having a surface in edgewise alignment with the surfaces of said cathode and collector electrodes, an accelerating electrode equidistantly spaced from each of said cathode, collector and isolating electrodes, means applying a negative potential with respect to said cathode to said isolating electrode and means applying a positive potential to said accelerating electrode with respect to said cathode electrode, means applying a magnetic field transverse to the path between said cathode and said accelerating electrode and means heating said cathode to a temperature of electron emissivity whereby electrons are emitted from said cathode and travel through cycloidal paths under the influence of crossed electric and magnetic fields to said collector electrode to be collected thereat.

9. An apparatus comprising a plurality of pairs of cathodes and collector electrodes having surfaces in edgewise alignment with each other, an isolating electrode between electrodes of each of said pairs and having a surface in edgewise alignment with the aligned surfaces thereof, an accelerating electrode spaced from each of said pairs of electrodes, means connecting said cathode electrodes to each other and said collector electrodes to each other, means rendering said accelerating electrode positive and said isolating electrode negative, both with respect to said cathode electrode, and means applying a magnetic field transverse to the path between said cathode and accelerating electrode.

10. An apparatus comprising an electron emissive cathode electrode and an electron collector electrode having spaced surfaces in edgewise alignment with each other, an isolating electrode interposed between said cathode and collector electrodes and having a surface in edgewise alignment with said surfaces of said cathode and collector electrodes, a plurality of accelerating electrodes in substantial edgewise alignment and being spaced from said cathode, collector and isolating electrodes, means rendering respective accelerating electrodes positive with respect to said cathode electrode and at different potentials and means rendering said isolating electrode negative with respect to said cathode electrode.

11. An apparatus comprising an electron emissive cathode electrode and an electron collector electrode having spaced surfaces in edgewise alignment with each other, an isolating electrode interposed between said cathode and collector electrodes and having a surface in edgewise alignment with said surfaces of said cathode and collector electrodes, an accelerating electrode spaced from and facing said cathode and isolating electrodes, further accelerating electrodes spaced from and facing said anode electrode, said accelerating electrodes being adjacent each other and means rendering said accelerating electrodes positive with respect to said cathode and said isolating electrode negative with respect to said cathode electrode.

References Cited in the file of this patent
UNITED STATES PATENTS

| | | |
|---|---|---|
| 1,903,569 | Jarvis et al. | Apr. 11, 1933 |
| 2,437,576 | Wick | Mar. 9, 1948 |
| 2,538,714 | Overbeek | Jan. 16, 1951 |
| 2,559,395 | Brown | July 3, 1951 |
| 2,680,823 | Dohler et al. | June 8, 1954 |
| 2,745,039 | Bowen | May 8, 1956 |
| 2,881,384 | Durant | Apr. 7, 1959 |
| 2,915,652 | Hatsopoulos et al. | Dec. 1, 1959 |

FOREIGN PATENTS

| | | |
|---|---|---|
| 797,872 | Great Britain | July 9, 1958 |

OTHER REFERENCES

Proceedings of IRE, September 1958, pages 1574–1579, "A Novel Thermoelectric Engine" by Hatsopoulos and Kaye.